(12) United States Patent
Balasubramanian et al.

(10) Patent No.: US 12,276,871 B2
(45) Date of Patent: Apr. 15, 2025

(54) HIGH EFFICIENCY POLARIZING LENS WITH COLOR ENHANCEMENT

(71) Applicant: ESSILOR INTERNATIONAL, Charenton-le-Pont (FR)

(72) Inventors: Srinivasan Balasubramanian, Dallas, TX (US); Elliot French, Dallas, TX (US); Aref Jallouli, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 835 days.

(21) Appl. No.: 17/475,802

(22) Filed: Sep. 15, 2021

(65) Prior Publication Data

US 2022/0100005 A1 Mar. 31, 2022

(30) Foreign Application Priority Data

Sep. 25, 2020 (EP) .................................. 20306098

(51) Int. Cl.
| | | |
|---|---|---|
| G02B 27/14 | (2006.01) | |
| A61F 9/02 | (2006.01) | |
| G02B 5/22 | (2006.01) | |
| G02C 7/00 | (2006.01) | |
| G02C 7/02 | (2006.01) | |

(Continued)

(52) U.S. Cl.
CPC .............. *G02C 7/108* (2013.01); *G02B 5/223* (2013.01); *G02C 7/12* (2013.01); *G02C 2202/16* (2013.01)

(58) Field of Classification Search
CPC .......... G02C 7/10; G02C 7/108; G02C 7/104; G02C 7/00; G02C 7/04; G02C 7/024; G02C 7/102; A61F 9/026; G02B 27/145; G02B 1/04; G02B 5/3033; G02B 1/08; G02B 5/30; G02B 1/041; G02B 1/043; G02B 1/10; G02B 1/115; C09K 2323/031
USPC ............ 359/487.02, 487.01, 491.01, 159.02; 351/41, 159.01, 159.02, 159.74–159.76
See application file for complete search history.

(56) References Cited

U.S. PATENT DOCUMENTS

2013/0155507 A1  6/2013 Ryu et al.
2016/0197309 A1* 7/2016 Drolet .................. G02B 27/286
  257/40

(Continued)

FOREIGN PATENT DOCUMENTS

EP   0 182 632   5/1986
EP   2 889 655   7/2015

(Continued)

OTHER PUBLICATIONS

Extended Search Report for EP20306098.3, dated Mar. 3, 2021, 10 pages.

*Primary Examiner* — Dawayne Pinkney
(74) *Attorney, Agent, or Firm* — NIXON & VANDERHYE (57) ABSTRACT

A light filtering element, includes: at least one layer, a first layer of the at least one layer being stretched along a strain direction and including a first narrowband dye, the first narrowband dye including a first narrowband dye peak absorbance wavelength with a first narrowband dye bandwidth; and a first dichroic dye configured to absorb polarized light, the first dichroic dye including a first dichroic dye peak absorbance wavelength with a first dichroic dye bandwidth, molecules of the first dichroic dye being at least partially oriented along the strain direction.

12 Claims, 4 Drawing Sheets

(51) Int. Cl.
G02C 7/10 (2006.01)
G02C 7/12 (2006.01)

(56) References Cited

U.S. PATENT DOCUMENTS

2019/0064549 A1* 2/2019 Brown ................... G02C 7/12
2019/0107736 A1* 4/2019 Gutierrez ............... G02C 7/049
2019/0250431 A1* 8/2019 Shan .................... G02B 5/3075
2021/0080755 A1* 3/2021 Balasubramanian .... G02C 7/12

FOREIGN PATENT DOCUMENTS

| EP | 2 950 122 | 12/2015 |
| JP | 2008-134618 | 6/2008 |
| WO | 2013/070417 | 5/2013 |

* cited by examiner

HIGH EFFICIENCY POLARIZING LENS WITH COLOR ENHANCEMENT

CROSS REFERENCE TO RELATED APPLICATION

This application claims priority to EP Patent Application No. 20306098.3 filed 25 Sep. 2020, the entire contents of which is hereby incorporated by reference.

FIELD OF THE INVENTION

The present disclosure relates to a color enhancing polarizing film with high polarization efficiency including dichroic dyes for absorbing polarized light and narrowband dyes for color enhancement.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Color enhancing polarized lenses in optical sunwear can be used to provide protection from sunlight and light that has become polarized such as after scattering off a non-metallic surface, while also filtering out predetermined wavelengths of light to facilitate a view that is more aesthetically pleasing, less eye-strain-inducing, or a combination of both. Some color enhancing polarizing lens can be fabricated by combining a polarizing film (e.g. a PVA polarizer) with a colored film, wherein the polarizing film has a high transmission of, for example, 30-35%. The addition of the colored film can improve color enhancement while reducing transmission to, for example, approximately 15%, thus leading to a sunglass lens that is commonly referred to as being category 3. However, in order to achieve the high transmission, the dichroic dye loading in the PVA polarizing film is lowered and this results in reduction of a polarization efficiency (PE) from greater than 99% PE (that can be obtained with PVA polarizers with % T<20%) down to under 97% PE. The lower PE can lead to some glare scattered from very high polarized glare surfaces penetrating the sunglass lens and reducing the vision of the user. Thus, a color enhancing polarized light filtering element having color enhancing properties while maintaining high polarization efficiency is desired.

Aspects of the invention may address some of the above-described shortcomings in the art, particularly with the solutions set forth in the claims.

SUMMARY

The present disclosure relates to a light filtering element, including: at least one layer, a first layer of the at least one layer being stretched along a strain direction and including a first narrowband dye, the first narrowband dye including a first narrowband dye peak absorbance wavelength with a first narrowband dye bandwidth; and a first dichroic dye configured to absorb polarized light, the first dichroic dye including a first dichroic dye peak absorbance wavelength with a first dichroic dye bandwidth, molecules of the first dichroic dye being at least partially oriented along the strain direction.

A second layer of the at least one layer may be integrated with the first layer of the at least one layer, the second layer of the at least one layer being a polarizing film configured to absorb polarized light. At least 25% of the first dichroic dye may be oriented along the strain direction; and a polarization efficiency of the light filtering element is greater than 97%. In some embodiments, the light filtering element is as described in the claims.

The present disclosure additionally relates to a method of forming a light filtering element, including: extruding a first layer, the first layer including a first narrowband dye, the first narrowband dye including a first narrowband dye peak absorbance wavelength with a first narrowband dye bandwidth, and a first dichroic dye configured to absorb polarized light, the first dichroic dye including a first dichroic dye peak absorbance wavelength with a first dichroic dye bandwidth; and stretching the first layer along a strain direction, molecules of the first dichroic dye being at least partially oriented along the strain direction. In some embodiments, the method for forming a light filtering element is as described in the claims.

Note that this summary section does not specify every feature and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein.

DETAILED DESCRIPTION

The following disclosure provides many different variations, or examples, for implementing different features of the provided subject matter. Specific examples of components and arrangements are described below to simplify the present disclosure. These are, of course, merely examples and are not intended to be limiting nor inoperable together in any permutation. Unless indicated otherwise, the features and embodiments described herein are operable together in any permutation. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. Inventive apparatuses may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Combinations of color contrast enhancements and polarized light filtration in sunglass lenses, and methods of fabrication the sunglass lens, are described herein. The color enhancing photochromic lenses can be fabricated via myriad processes to produce lenses that filter predetermined wavelength ranges of light as well as polarized light at greater than 97% polarization efficiency (PE).

Figure 1:
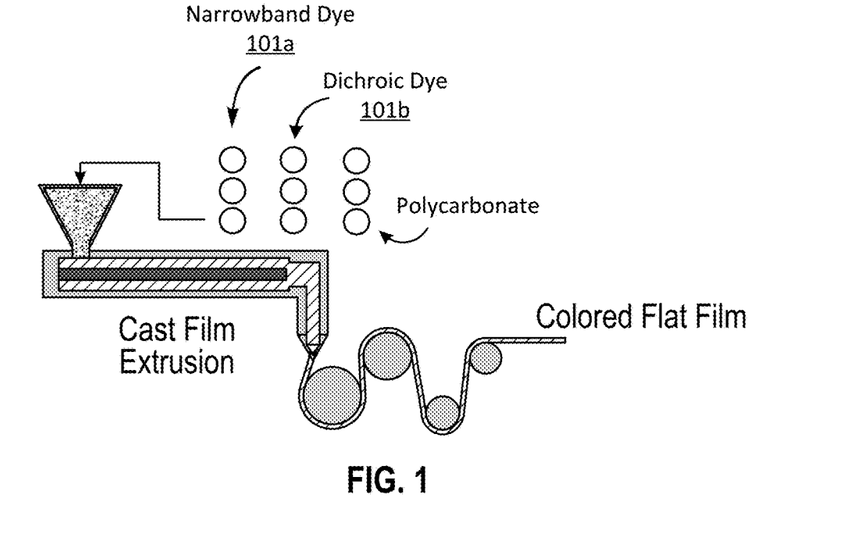
FIG. 1 is a cross-sectional schematic of an extrusion device, within the scope of the present disclosure.

FIG. 1 shows an exemplary cross-sectional schematic of an exemplary extrusion device, useful within the scope of the present disclosure. The extrusion device may be a screw extruder and can include a hopper, a screw, and/or a first set of rollers. As shown in FIG. 1, the hopper can receive pellets of one or more materials, separately, or a mixture of materials. For example, the hopper can receive a mixture of polycarbonate pellets and dye pellets 101. Subsequently, the dye pellets 101 material can be heated and fed to the screw. The heating can heat the dye pellets 101 to above a glass transition temperature of the dye pellets 101, resulting in mixing of the dye pellets 101 when more than one dye pellets 101 material is mixed in the hopper. The screw, which could also be a dual or multiple screw arrangement, can push the dye pellets 101 material from the hopper to one or more nozzles of the extrusion device where melted dye pellets 101 can exit, cool, and be pulled by the first set of rollers. The first set of rollers can pull or extrude the dye pellets 101 material into a color enhancing film. The color enhancing film can be substantially flat, e.g., within 5, 2.5, or 1% of planarity, and/or with a roughness, $R_A$, of no more than 0.8, 0.2, or 0.05 μm, and formed in the extrusion device via pellets of a first narrowband dye (or mixture of 2, 3, or more narrowband dyes) 101a and a first dichroic dye (or mixture of 2, 3, or more dichroic dyes) 101b. The first narrowband dye 101a can include a first narrowband dye peak absorbance wavelength with a first narrowband dye bandwidth, and the first dichroic dye 101b can be configured to absorb polarized light, the first dichroic dye 101b including a first dichroic dye peak absorbance wavelength with a first dichroic dye bandwidth.

Figure 2:
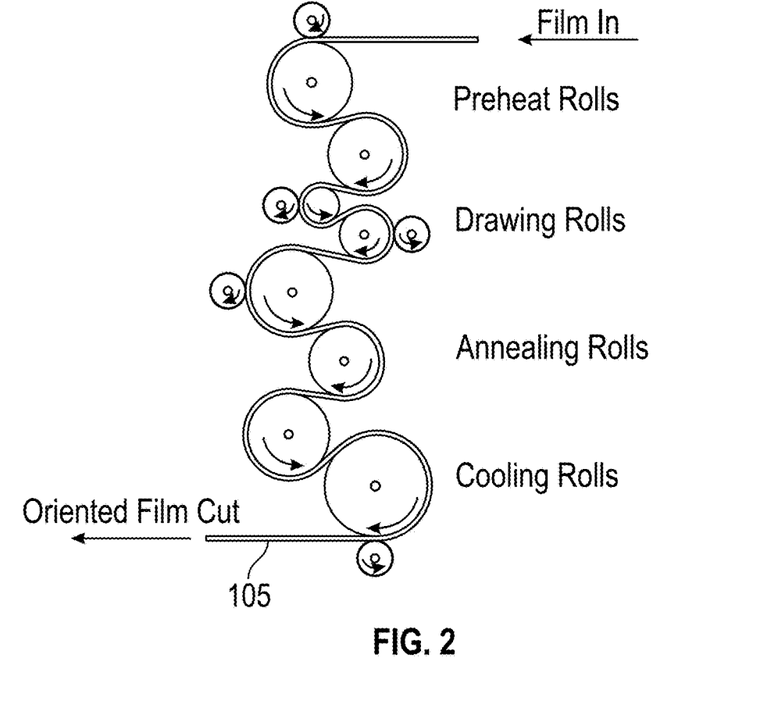
FIG. 2 is a cross-sectional schematic of a stretching device, within the scope of the present disclosure.

FIG. 2 shows an exemplary inventive cross-sectional schematic of an exemplary stretching device. The stretching device can include a second, third, or further set of rollers. In a non-limiting example, the stretching device can be a Machine Direction Orienter (MDO). The stretching device can be configured to stretch the color enhancing film by feeding the color enhancing film through a progression of rollers in the second set of rollers that heat, stretch, anneal, and cool the color enhancing film. Notably, the color enhancing film can be stretched or elongated, for example, along a strain direction, thereby aligning molecules of the first dichroic dye 101b also along the strain direction to yield a color enhancing polarizing film (CEPF) 105 as it exits the stretching device. That is, the strain direction can be along the stretch or elongation direction of the color enhancing film as it is fed through the stretching device to form into the stretched CEPF 105. It may be appreciated that a different stretching device may be utilized to stretch the color enhancing film to produce the CEPF 105 such that the stretch direction is not the same as the direction the color enhancing film is fed through the stretching device. For example, the stretching device can include a series of clamps configured to pull the color enhancing film in an orthogonal direction relative to the direction the color enhancing film is fed into the stretching device. In such an example, the strain direction (or the stretching direction) is orthogonal to direction through which the film travels through the stretching device.

The material to make the color enhancing film and the CEPF 105 can be selected from a variety of optical grade thermoplastics, for example, polycarbonate (PC), polyamide such as nylon, thermoplastic polyurethane (TPU), polyethylene terephthalate (PET), or any combination thereof, among others. The stretch ratio of the CEPF 105 can be between, for example, 1:1.1 to 1:10, or 1:1.5 to 1:8, or 1:2 to 1:6. In the event the CEPF 105 is not sufficiently stretched or stretched at all, the first dichroic dye 101b will generally be more randomly oriented and there may be less of an increase in the PE of the eventual final lens product. In order to observe the maximum increase in the PE, the first dichroic dye 101b should typically be fully oriented. It may be appreciated that additional narrowband dyes, dichroic dyes, and broadband dyes can be included to yield a predetermined absorbance spectrum for the eventual final lens product while conserving the high PE. Further, the first narrowband dye 101a can be configured to absorb at a predetermined wavelength of light, i.e. the first narrowband dye peak absorbance wavelength. For example, the first narrowband dye peak absorbance wavelength is 500 nm or 598 nm, anywhere in a range of from 475 to 525, 490 to 510, 495 to 505, or 498 to 502 nm, or anywhere in a range of from 575 to 625, 585 to 610, 590 to 600, or 595 to 599 nm.

Figure 3:
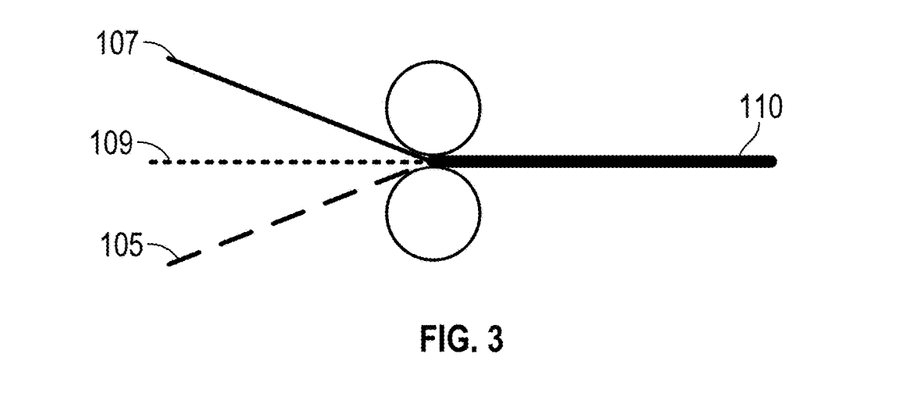
FIG. 3 is a cross sectional schematic of lamination of a color enhancing polarizing film with additional layers, within the scope of the present disclosure.

FIG. 3 shows an exemplary inventive cross sectional schematic of lamination of the CEPF 105 with additional layers. The CEPF 105 can be laminated with a polarizing film 107 and a transparent film 109. For example, the polarizing film 107 can be a PVA polarizing film, and the transparent film 109 can be a clear polycarbonate film. The CEPF 105 can be laminated to the polarizing film 107 such that a first side of the CEPF 105 faces away from the polarizing film 107 while a second side of the CEPF 105 can contact a first side of the polarizing film 107. Similarly, a second side of the polarizing film 107 can contact a first side of the transparent film 109. Thus, the polarizing film 107 can be laminated in between the CEPF 105 and the transparent film 109.

The polarizing film 107 and the transparent film 109 can also be stretched along one direction, i.e., unidirectionally or uniaxially, such as along the strain direction. Subsequently, the CEPF 105, the polarizing film 107, and the transparent film 109 can be laminated in a manner that aligns the three layers along the strain direction. That is, a stretch axis of the three layers is parallel during lamination. Upon lamination, the resulting three layer structure is a color enhancing high polarization efficiency (CEHPE) laminate 110.

Figure 4:
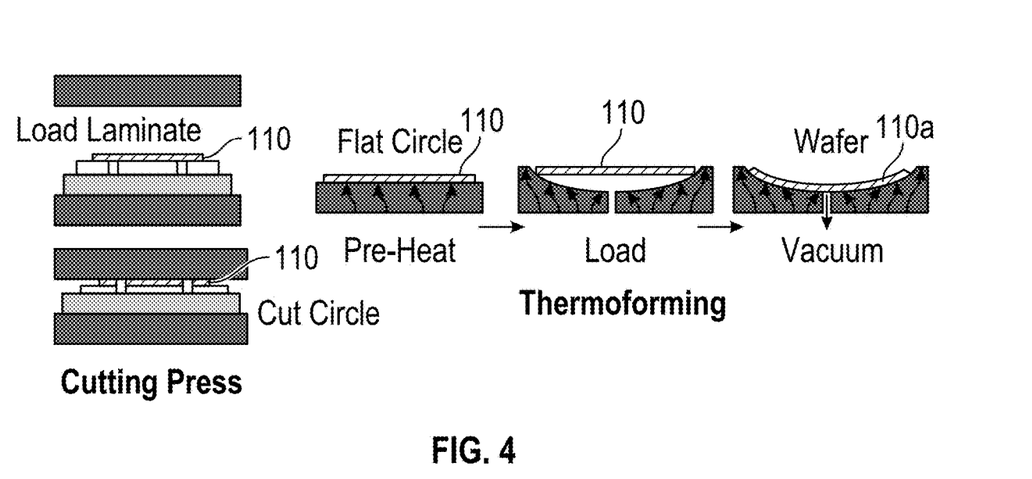
FIG. 4 is a cross sectional schematic of thermoforming of a color enhancing high polarization efficiency laminate, within the scope of the present disclosure.

FIG. 4 shows an exemplary inventive cross sectional schematic of thermoforming of the CEHPE laminate 110. The CEHPE laminate 110 can optionally be cut to a predetermined size using a cutting press. The predetermined size can be based on a particular glasses frame design, for example. The CEHPE laminate 110 can be thermoformed using a thermoformer to introduce a base curvature to the CEHPE laminate 110. The CEHPE laminate 110 can be pre-heated, for example, to just under the glass transition temperature of the CEHPE laminate 110, using a heating device. The heat can make the CEHPE laminate 110 more amorphous and pliable for the subsequent steps. After pre-heating, the CEHPE laminate 110 can be loaded into the thermoformer having a predetermined base curvature. A vacuum force can be applied to pull the CEHPE laminate 110 onto the surface of the thermoformer to adopt the base curvature of the thermoformer, thereby producing a thermoformed CEHPE laminate 110a. The CEPF 105 becomes a concave surface of the CEHPE laminate 110a and the transparent film 109 becomes a convex surface of the CEHPE laminate 110a.

Figure 5:
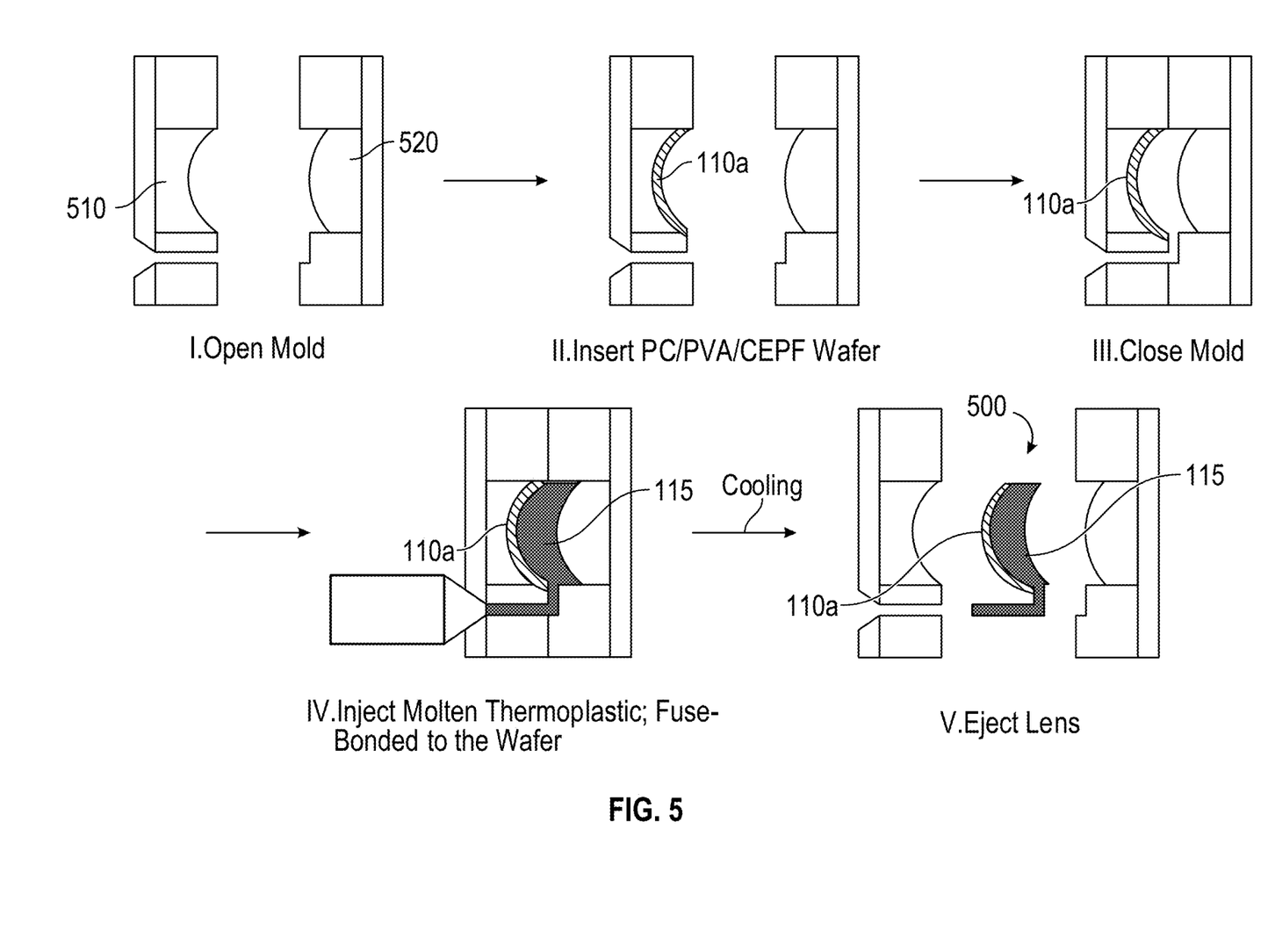
FIG. 5 is a cross sectional schematic of injection molding, within the scope of the present disclosure.

FIG. 5 shows an exemplary inventive cross sectional schematic of an exemplary injection molding. The thermoformed CEHPE laminate 110a can then be molded to a convex side of a semi-finished (SF) lens using a standard SF wafer over-molding process. As shown, a first mold side including a concave mold insert 510 can be configured to couple with a second mold side including a convex mold insert 520. Upon coupling, the concave mold insert 510 and the convex mold insert 520 can form a cavity connected to a hollow line formed by the coupling of the first and second mold sides. The line can be configured to receive a polymer 115, for example, via a screw feeder or similar device. The polymer 115 can be, for example, a clear polycarbonate resin or other polymer, particularly thermoplastic, or composition of polymers, e.g., having a transparency of at least 90, 95, or 97.5%. The cavity can be configured to receive the thermoformed CEHPE laminate 110a. A curvature of the concave mold insert 510 and a curvature of the convex mold insert 520 can determine a lens power of the resulting lens. For a SF lens, a curvature along a convex side of the lens is fixed and the concave side of the lens can be modified after molding, for example, via grinding and polishing. As previously described, the polymer 115 can be injected onto the first side of the CEPF 105 of the thermoformed CEHPE laminate 110a to make a color enhancing high polarization efficiency lens 500.

The aforementioned process may be utilized to make the color enhancing high polarization efficiency lens 500, but instead the thermoforming can be performed such that the transparent film 109 and the CEPF 105 are on opposite sides of the polarizing film 107. That is, the CEPF 105 becomes the convex surface of the CEHPE laminate 110a and the transparent film 109 becomes the concave surface of the CEHPE laminate 110a. Thus, upon injection molding, the polymer 115 can be injected and fused to the transparent film 109.

The first narrowband dye 101a and the first dichroic dye 101b can be integrated into a coating matrix that can be aligned along the strain direction. The coating matrix can be applied onto a polarizing lens, for example, a category 2 polarizing lens, and the dichroic dye can be subsequently aligned. First, an alignment layer can be spin coated onto the polarizing lens. Polarized UV light exposure can then cause alignment of the alignment layer, wherein the alignment layer includes liquid crystal molecules which align along the polarization direction. The coating matrix including the first narrowband dye 101a and the dichroic dye 101b can be spin coated onto the alignment layer. The aligned liquid crystal molecules in the alignment layer can then interact with the molecules of the first dichroic dye to align the molecules of the first dichroic dye along the same strain direction as the liquid crystal molecules. Subsequently, an optional protective layer can be spin coated over the coating matrix.

Note that category 4 may refer to transmission below 8%, category 3 may refer to transmission between 8% and 18%, category 2 may refer to transmission between 18% to 43%, and category 1 may refer to transmission between 43% to 75%.

The first narrowband dye 101a and the first dichroic dye 101b can be integrated into a solution that can be aligned along the strain direction. First, a sol gel coating can be spin coated onto the polarizing lens, for example, a category 2 polarizing lens. Mechanical scribing of the surface can be performed to induce microgrooves along the scribing direction, i.e. the strain direction. The microgrooves can be retained upon curing of the sol gel coating. Subsequently, the solution including the first narrowband dye 101a and the first dichroic dye 101b can be spin coated onto the sol gel coating. The first dichroic dye 101b molecules can then align along the strain direction of the microgrooves and provide polarization functionality. An optional protective layer can be spin coated over top.

The CEHPE laminate 110 and the resulting color enhancing high polarization efficiency lens 500 can provide a PE of, for example, greater than 97%, greater than 97.5%, greater than 98%, greater than 98.5%, or, greater than 99%. Non-limiting examples of dyes that can be used to fabricate the CEHPE laminate 110 and resulting color enhancing high polarization efficiency lens 500 are described as follows.

The first narrowband dye 101a: narrowband absorbers such as Epolight 5841, Epolight 5819 and Epolight 6698 (Epolin).

The first dichroic dye 101b: dichroic dyes that are compatible with blending into optical thermoplastic polymers and melt extrusion: Blue AB2, Blue AB3, Blue AB4, Orange AO1, Orange AZO1, Yellow AG1, Red AR1 and Cyan AC1 (Nematel, Gmbh).

The CEPF 105 can be fabricated by blending a combination of the first narrowband dye 101a and the first dichroic dye 101b to achieve the desired absorption spectrum and extruding an optical quality film using the extrusion device. Other dyes with similar absorption spectrum and dichroic properties could be used as well.

EXAMPLES

Example 1

The relative absorbance spectra of various first dichroic dyes 101b in solution along with the extinction spectra of various color contrast enhancing first narrowband dyes 101a in polycarbonate were used to simulate a color enhancing lens with very high polarization efficiency. The results of this simulation are shown next:

Description of dyes used in the CEPF film (film thickness=0.300 mm):

TABLE 1

| Dye | | ppm | λmax | Extinction at λmax [1 * ppm$^{-1}$ * mm$^{-1}$] | FWHM |
|---|---|---|---|---|---|
| UVA (FUV008) | | 660 | 386 nm | 9.95E-2 | — |
| Narrow band | Epolight 5841 | 65 | 498 nm | 3.14E-2 | 34 nm |
| Isotropic | Epolight 5819 | 120 | 585 nm | 2.16E-2 | 20 nm |
| *Dichroic | AG1 | 13,604 | 451 nm | 1.87E-5 | 83 nm |
| | AZO1 | 3,655 | 482 nm | 7.76E-5 | 120 nm |
| | AR1 | 10,931 | 551 nm | 2.08E-5 | 87 nm |
| | AB3 | 12,576 | 596 nm | 2.74E-5 | 114 nm |
| | AC1 | 15,638 | 659 nm | 2.25E-5 | 127 nm |

*Dichroic dye values obtained from solution spectral data

Lens Properties:

TABLE 2

| | (Prior Art) Category 3 non-color enhancing lens with high PE | (Prior Art) Category 3 color enhancing lens with lower PE | (Improvement of this invention) Category 3 color enhancing lens with high PE |
|---|---|---|---|
| % Tv | 16.4% | 15.1% | 15.3 |
| PE | >98% | <98% | >98% |
| % ΔC$_{avg}$ from no filter | -0.4% | 10.5% | 10.6% |
| L | 47.8 | 45.5 | 45.8 |
| a | -3.5 | 6.4 | 6.8 |
| b | -4.2 | -6.9 | -6.3 |
| T440/Tv | 1.10 | 1.48 | 1.48 |
| T498/Tv | 1.23 | 0.40 | 0.40 |
| T540/Tv | 1.01 | 1.19 | 1.19 |
| T585/Tv | 0.90 | 0.26 | 0.26 |
| T640/Tv | 1.02 | 1.46 | 1.43 |

TABLE 3

| Sample | Alignment % | Total PE |
|---|---|---|
| Category 2 PVA polarizing film | | 96.00% |
| CEPF with varying level of dichroic dye alignment | 0% | 96.00% |
| | 25% | 97.40% |
| | 50% | 98.80% |
| | 75% | 99.40% |
| | 100% | 99.80% |

Note: A 100% alignment % represents a film where the dichroic dyes are optimally aligned in the stretch direction; an alignment % of 0% represents a film where the dichroic dyes are randomly oriented.

Figure 6:
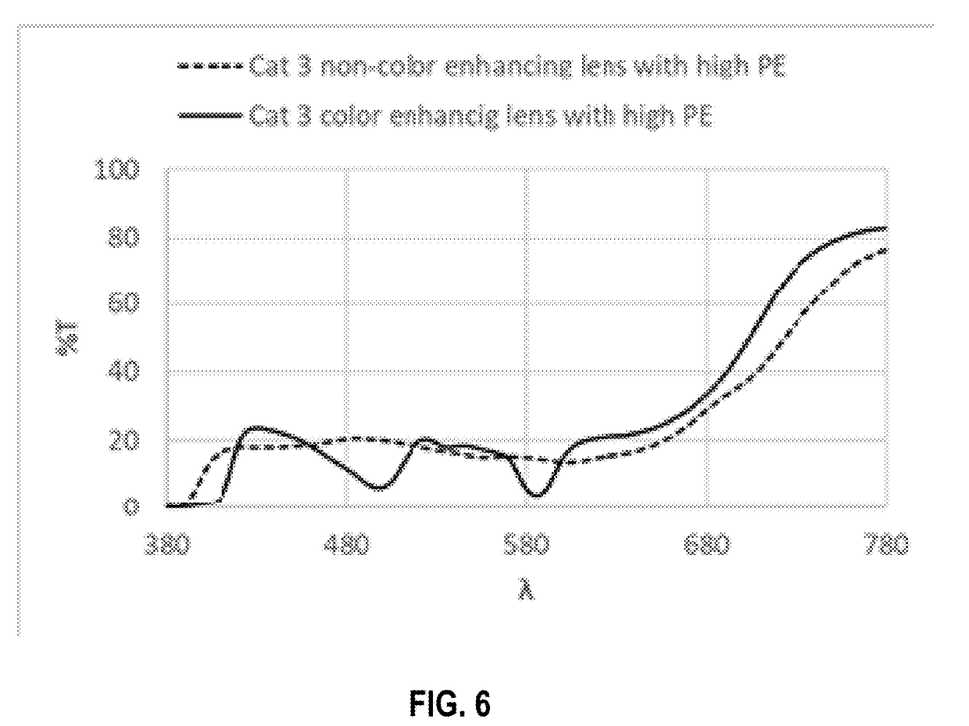
FIG. 6 shows a graph of transmission of two lenses, within the scope of the present disclosure.

FIG. 6 shows a graph of transmission of two exemplary inventive lenses. As shown, the lens including color enhancement with high polarization efficiency includes absorption peaks located at approximately 498 nm and 585 nm.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted. Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than specifically described unless expressly indicated otherwise. Various additional operations may be performed and/or described operations may be omitted.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

Embodiments of the present disclosure may also be as set forth in the following parentheticals.

(1) A light filtering element, comprising: at least one layer, e.g., two, three, four, five, or more layers, a first layer of the at least one layer being stretched along a strain direction and including a first narrowband dye, the first narrowband dye including a first narrowband dye peak absorbance wavelength with a first narrowband dye bandwidth; and a first dichroic dye configured to absorb polarized light, the first dichroic dye including a first dichroic dye peak absorbance wavelength with a first dichroic dye bandwidth, molecules of the first dichroic dye being at least partially oriented along the strain direction.

(2) The element of (1), wherein a second layer of the at least one layer is integrated with the first layer of the at least one layer, the second layer of the at least one layer being a polarizing film configured to absorb polarized light.

(3) The element of either (1) or (2), wherein the first narrowband dye peak absorbance wavelength is approximately 498 nm, e.g., 450 to 550, 475 to 525, 490 to 510, or 495 to 499 nm; and the first narrowband dye bandwidth is less than 40, 30, 20, or 10 nm.

(4) The element of any one of (1) to (3), wherein at least 25, 30, 35, or 50% of the first dichroic dye is oriented along the strain direction; and a polarization efficiency of the light filtering element is greater than 97, 98, 99, or 99.5%.

(5) The element of any one of (1) to (4), further comprising: a lens integrated with the at least one layer, wherein a third layer of the at least one layer is integrated with the second layer of the at least one layer, the third layer of the at least one layer being a transparent film.

(6) A light filtering element, comprising: a lens; and at least one layer including a first layer, a second layer, and a third layer, wherein the first layer of the at least one layer is stretched along a strain direction and includes a first narrowband dye, the first narrowband dye including a first narrowband dye peak absorbance wavelength with a first narrowband dye bandwidth; and a first dichroic dye configured to absorb polarized light, the first dichroic dye including a first dichroic dye peak absorbance wavelength with a first dichroic dye bandwidth, molecules of the first dichroic dye being at least partially oriented along the strain direction, the second layer of the at least one layer is integrated with the first layer of the at least one layer, the second layer of the at least one layer being a polarizing film configured to absorb polarized light, the third layer of the at least one layer is integrated with the second layer of the at least one layer, the third layer of the at least one layer being a transparent film, and the lens is integrated with the at least one layer.

(7) The element of (6), wherein the first narrowband dye peak absorbance wavelength is approximately 498 nm, e.g., 450 to 550, 475 to 525, 490 to 510, or 495 to 499 nm; and the first narrowband dye bandwidth is less than 40, 30, 20, or 10 nm.

(8) The element of either (6) or (7), wherein at least 25, 30, 35, or 50% of the first dichroic dye is oriented along the strain direction; and a polarization efficiency of the light filtering element is greater than 97, 98, 99, or 99.5%.

(9) The element of any one of (6) to (8), wherein the first narrowband dye is dichroic and configured to absorb polarized light.

(10) The element of any one of (6) to (9), wherein the first layer of the at least one layer further includes a second narrowband dye, the second narrowband dye including a second narrowband dye peak absorbance wavelength equal to approximately 585 nm, e.g., 525 to 633, 550 to 615, 575 to 595, or 580 to 590 nm, and a second narrowband dye bandwidth is less than 40, 30, 20, or 10 nm.

(11) A method of forming a light filtering element, comprising: extruding a first layer, the first layer including a first narrowband dye, the first narrowband dye including a first narrowband dye peak absorbance wavelength with a first narrowband dye bandwidth, and a first dichroic dye configured to absorb polarized light, the first dichroic dye including a first dichroic dye peak absorbance wavelength with a first dichroic dye bandwidth; and stretching the first layer along a strain direction, molecules of the first dichroic dye being at least partially oriented along the strain direction.

(12) The method of (11), further comprising: laminating the stretched first layer to a second layer, the second layer configured to absorb light polarized perpendicular to a polarization axis of the second layer; laminating a third layer to the second layer, the third layer being optically transparent; forming the first stretched layer, the second layer, and the third layer to a wafer having a predetermined curvature; and optically coupling the thermoformed wafer to a lens.

(13) The method of either (11) or (12), wherein the first narrowband dye peak absorbance wavelength is approximately 498 nm, e.g., 450 to 550, 475 to 525, 490 to 510, or 495 to 499 nm; and the first narrowband dye bandwidth is less than 40, 30, 20, or 10 nm.

(14) The method of either (11) or (12), wherein the first layer includes a second narrowband dye, the second narrowband dye including a second narrowband dye peak absorbance wavelength equal to approximately 585 nm, e.g., 525 to 633, 550 to 615, 575 to 595, or 580 to 590 nm, and a second narrowband dye bandwidth is less than 40, 30, 20, or 10 nm.

(15) The method of either (11) or (12), wherein at least 25, 30, 35, or 50% of the first dichroic dye is oriented along the strain direction; and a polarization efficiency of the light filtering element is greater than 97, 98, 99, or 99.5%.

(16) A method of forming a light filtering element, comprising: coating a polarizing lens with a first layer, the first layer configured to align molecules of a first dichroic dye; coating the first layer with a second layer, the second layer including a first narrowband dye, the first narrowband dye including a first narrowband dye peak absorbance wavelength with a first narrowband dye bandwidth, and the first dichroic dye configured to absorb polarized light, the first dichroic dye including a first dichroic dye peak absorbance wavelength with a first dichroic dye bandwidth; and coating the second layer with a third layer, the third layer configured to prevent damage to the first layer and the second layer.

(17) The method of (16), wherein the coating lens with the first layer further comprises: exposing the first layer to polarized UV light, the polarized UV light configured to align liquid crystal molecules in the first layer, the liquid crystal molecules interacting with the molecules of the first dichroic dye in the second layer to align the molecules of the first dichroic dye along a direction of the liquid crystal molecules.

(18) The method of either (16) or (17), wherein the coating the first layer with the second layer further comprises: forming a plurality of grooves in a surface of the second layer along a strain direction; and curing the second layer, wherein the molecules of the first dichroic dye in the second layer is aligned along the strain direction.

(19) The method of any one of (16) to (18), wherein the first narrowband dye peak absorbance wavelength is approximately 498 nm, e.g., 450 to 550, 475 to 525, 490 to 510, or 495 to 499 nm; and the first narrowband dye bandwidth is less than 40, 30, 20, or 10 nm.

(20) The method of any one of (16) to (19), wherein at least 25, 30, 35, or 50% of the first dichroic dye is oriented along the strain direction; and a polarization efficiency of the light filtering element is greater than 97, 98, 99, 99.5, 99.9, or 99.95%.

(21) The method of any one of (16) to (20), wherein the coating is performed via spin coating.

(22) The method of any one of (16) to (21), wherein the first layer is a sol gel layer.

(23) The method of any one of (16) to (22), wherein a transmission range of the polarizing lens is in the range of 18% to 45%, 20 to 40%, or 25 to 33%.

(24) The element of any one of (2) to (5), wherein a stretch ratio of the at least one layer is between 1:2 and 1:6, 1:2.5 to 1:5, or 1:3 to 1:4.

(25) The element of any one of (2) to (5), wherein at least 75, 80, 85, or 90% of the first dichroic dye is oriented along the strain direction; and a polarization efficiency of the light filtering element is greater than 97, 98, 99, 99.5, 99.9, or 99.95%.

(26) The element of any one of (2) to (5), wherein the second layer of the at least one layer has a polarization efficiency greater than 96, 97, 98, 99, or 99.5%.

What is claimed is:

1. A light filtering element, comprising:
   at least one layer, a first layer of the at least one layer being stretched along a strain direction and including
      a first narrowband dye, the first narrowband dye including a first narrowband dye peak absorbance wavelength with a first narrowband dye bandwidth; and
      a first dichroic configured to absorb polarized light, the first dichroic dye including a first dichroic dye peak absorbance wavelength with a first dichroic dye bandwidth, molecules of the first dichroic dye being at least partially oriented along the strain direction;
   at least 25% of the first dichroic dye being oriented along the strain direction; and
   a polarization efficiency of the light filtering element being greater than 97%.

2. The light filtering element according to claim 1, wherein
   a second layer of the at least one layer is integrated with the first layer of the at least one layer, the second layer of the at least one layer being a polarizing film configured to absorb polarized light.

3. The light filtering element according to claim 1, wherein
the first narrowband dye peak absorbance wavelength is approximately 498 nm; and
the first narrowband dye bandwidth is less than 40 nm.

4. The light filtering element according to claim 1, further comprising:
a lens integrated with the at least one layer, wherein
a third layer of the at least one layer is integrated with the second layer of the at least one layer, the third layer of the at least one layer being a transparent film.

5. A light filtering element, comprising:
a lens; and
at least one layer including a first layer, a second layer, and a third layer, wherein
the first layer of the at least one layer is stretched along a strain direction and includes
a first narrowband dye, the first narrowband dye including a first narrowband dye peak absorbance wavelength with a first narrowband dye bandwidth; and
a first dichroic dye configured to absorb polarized light, the first dichroic dye including a first dichroic dye peak absorbance wavelength with a first dichroic dye bandwidth, molecules of the first dichroic dye being at least partially oriented along the strain direction, at least 25% of the first dichroic dye being oriented along the strain direction;
the second layer of the at least one layer is integrated with the first layer of the at least one layer, the second layer of the at least one layer being a polarizing film configured to absorb polarized light,
the third layer of the at least one layer is integrated with the second layer of the at least one layer, the third layer of the at least one layer being a transparent film,
the lens is integrated with the at least one layer; and
a polarization efficiency of the light filtering element is greater than 97%.

6. The light filtering element according to claim 5, wherein
the first narrowband dye peak absorbance wavelength is approximately 498 nm; and
the first narrowband dye bandwidth is less than 40 nm.

7. The light filtering element according to claim 5, wherein the first narrowband dye is dichroic and configured to absorb polarized light.

8. The light filtering element according to claim 5, wherein
the first layer of the at least one layer further includes a second narrowband dye, the second narrowband dye including a second narrowband dye peak absorbance wavelength equal to approximately 585 nm and a second narrowband dye bandwidth is less than 40 nm.

9. A method of forming a light filtering element, comprising:
extruding a first layer, the first layer including
a first narrowband dye, the first narrowband dye including a first narrowband dye peak absorbance wavelength with a first narrowband dye bandwidth, and
a first dichroic dye configured to absorb polarized light, the first dichroic dye including a first dichroic dye peak absorbance wavelength with a first dichroic dye bandwidth; and
stretching the first layer along a strain direction, molecules of the first dichroic dye being at least partially oriented along the strain direction,
wherein at least 25% of the first dichroic dye is oriented along the strain direction, and a polarization efficiency of the light filtering element is greater than 97%.

10. The method according to claim 9, further comprising:
laminating the stretched first layer to a second layer, the second layer configured to absorb light polarized perpendicular to a polarization axis of the second layer;
laminating a third layer to the second layer, the third layer being optically transparent;
forming the first stretched layer, the second layer, and the third layer to a wafer having a predetermined curvature; and
optically coupling the thermoformed wafer to a lens.

11. The method according to claim 9, wherein
the first narrowband dye peak absorbance wavelength is approximately 498 nm; and
the first narrowband dye bandwidth is less than 40 nm.

12. The method according to claim 9, wherein
the first layer includes a second narrowband dye, the second narrowband dye including a second narrowband dye peak absorbance wavelength equal to approximately 585 nm and a second narrowband dye bandwidth is less than 40 nm.

* * * * *